(12) United States Patent
Yang et al.

(10) Patent No.: US 9,584,305 B2
(45) Date of Patent: Feb. 28, 2017

(54) DESKEW FIFO BUFFER WITH SIMPLIFIED INITIALIZATION

(71) Applicant: Oracle International Corporation, Redwood Shores, CA (US)

(72) Inventors: Suwen Yang, Mountain View, CA (US); Mark R. Greenstreet, Vancouver (CA); Tarik Ono, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/965,389

(22) Filed: Dec. 10, 2015

(65) Prior Publication Data

US 2016/0173266 A1    Jun. 16, 2016

Related U.S. Application Data

(60) Provisional application No. 62/090,221, filed on Dec. 10, 2014.

(51) Int. Cl.
*H04L 7/00*     (2006.01)
*H04L 29/06*    (2006.01)
*H04L 7/033*    (2006.01)

(52) U.S. Cl.
CPC .............. *H04L 7/005* (2013.01); *H04L 7/033* (2013.01); *H04L 69/08* (2013.01)

(58) Field of Classification Search
CPC ......... H04L 69/08; H04L 7/005; H04L 7/033; H04L 7/02; H04J 3/0632
See application file for complete search history.

(56) References Cited

U.S. PATENT DOCUMENTS 6,128,319 A * 10/2000 Ngai ..................... H04L 7/0066
                                              370/516
7,826,488 B2 * 11/2010 Lanzone ................... H04J 3/07
                                              370/428

(Continued)

*Primary Examiner* — Ross Varndell
(74) *Attorney, Agent, or Firm* — Park, Vaughan, Fleming & Dowler LLP

(57) ABSTRACT

A source-synchronization interface circuit includes: a sender synchronous-to-asynchronous protocol converter that receives sender data and a sender clock and that has regenerative gain to resolve metastability during phase synchronization of the sender clock and a receiver clock; an asynchronous FIFO buffer with multiple stages that conveys phase information and data from the sender synchronous-to-asynchronous protocol converter to a receiver synchronous-to-asynchronous protocol converter; and a receiver synchronous-to-asynchronous protocol converter that receives the receiver clock and that has regenerative gain to resolve metastability during the phase synchronization. Moreover, the source-synchronization interface circuit includes control logic that initializes the source-synchronization interface circuit by operating the stages in the asynchronous FIFO buffer in a slow mode having a cycle time less than a data-transfer period for a predetermined number of clock cycles, and subsequently operating the stages in a normal mode having a cycle time that is less than that for the slow mode.

20 Claims, 8 Drawing Sheets

(56) References Cited

U.S. PATENT DOCUMENTS

| | | | | |
|---|---|---|---|---|
| 7,900,078 B1 * | 3/2011 | Manohar | ................... | G06F 1/12 |
| | | | | 326/39 |
| 8,711,889 B2 * | 4/2014 | Lanzone | ................... | H04J 3/07 |
| | | | | 370/537 |
| 2009/0278567 A1 * | 11/2009 | Suzuki | ............... | H03K 19/0185 |
| | | | | 326/80 |

* cited by examiner

DESKEW FIFO BUFFER WITH SIMPLIFIED INITIALIZATION

CROSS-REFERENCE TO RELATED APPLICATION

This application claims priority under 35 U.S.C. §119(e) to U.S. Provisional Application Ser. No. 62/090,221, entitled "Simple Deskew FIFOs with Even Simpler Initialization," by Suwen Yang and Mark Greenstreet, filed on Dec. 10, 2014, the contents of which are herein incorporated by reference.

BACKGROUND

Field

The present disclosure relates to the design of a deskew first-in, first-out (FIFO) buffer. More specifically, the present disclosure relates to the design of a FIFO buffer having simplified initialization.

Related Art

Modern ASIC and CPU designs are often partitioned into multiple communicating clock domains. The throughput and latency of the synchronizing blocks that form the interfaces between these clock domains can be critical for overall performance and robust operation. Often, these clocks are generated from the same source and have the same fundamental frequency but an unknown phase offset because of the partitioning of the design. In other cases, the clock frequencies may have known rational ratios. In these cases, mesochronous (matched frequency) implementations can accommodate unknown or large clock skews with the advantage that metastable behavior is excluded after initialization.

In one existing circuit, a single-stage, handshaking first-in, first-out (FIFO) is used as an efficient mesochronous interface. However, it may be difficult to adopt this existing circuit in typical design flows. In particular, the existing circuit may use custom, dynamic logic to implement edge-triggered C-elements. Moreover, the initialization procedure used with the existing circuit may involve continuously sweeping the power supply voltage to the interface. Furthermore, the existing circuit may be limited to a single FIFO stage. While this architecture may be sufficient to accommodate arbitrary phase offsets for a wide variety of applications, it may not be able to tolerate substantial drifts in skew during the operation of the interface.

Hence, what is needed is an interface for use between clock domains without the above-described problems.

SUMMARY

One embodiment of the present disclosure provides a source-synchronization interface circuit. This source-synchronization interface circuit includes a sender synchronous-to-asynchronous protocol converter that, during operation, receives sender data and a sender clock having a first period and a sender phase, where the sender synchronous-to-asynchronous protocol converter has regenerative gain to resolve metastability during phase synchronization of the sender clock and a receiver clock. Moreover, the source-synchronization interface circuit includes an asynchronous first-in, first-out (FIFO) buffer electrically coupled to the sender synchronous-to-asynchronous protocol converter, where the asynchronous FIFO buffer includes multiple stages and, during operation, conveys data from the sender synchronous-to-asynchronous protocol converter to a receiver synchronous-to-asynchronous protocol converter. Furthermore, the source-synchronization interface circuit includes the receiver synchronous-to-asynchronous protocol converter, electrically coupled to the asynchronous FIFO buffer, which, during operation, receives a receiver clock having a period, which is the first period or a rational multiple of the first period, and a receiver phase, where the receiver synchronous-to-asynchronous protocol converter has regenerative gain to resolve metastability during the phase synchronization. Note that the asynchronous FIFO buffer conveys information corresponding to the sender phase to the receiver synchronous-to-asynchronous protocol converter and information corresponding to the receiver phase to the sender synchronous-to-asynchronous protocol converter. Moreover, the data is transferred from the sender to the source-synchronization interface circuit, and from the source-synchronization interface circuit to the receiver with a data-transfer period that is the same as the first period or the rational multiple of the first period. Additionally, the source-synchronization interface circuit includes control logic, electrically coupled to the asynchronous FIFO buffer. During operation, the control logic initializes the source-synchronization interface circuit by: operating at least some of the stages in the asynchronous FIFO buffer in a slow mode having a cycle time less than the data-transfer period for a predetermined number of clock cycles (such as N or more clock cycles); and subsequently operating at least some of the stages in the asynchronous FIFO buffer in a normal mode having a cycle time that is less than that for the slow mode.

Note that, during the initialization, the control logic may operate all of the stages in the asynchronous FIFO buffer in the slow mode for the predetermined number of clock cycles.

Moreover, the initialization may ensure that a digital data buffer in the asynchronous FIFO buffer is approximately half full.

Furthermore, the source-synchronization interface circuit may include FIFO buffers between the sender synchronous-to-asynchronous protocol converter and the receiver synchronous-to-asynchronous protocol converter.

In some embodiments, the sender synchronous-to-asynchronous protocol converter and the receiver synchronous-to-asynchronous protocol converter are each half of a phase-frequency detector.

Additionally, the asynchronous FIFO buffer may include an asynchronous ripple FIFO buffer.

Note that the asynchronous FIFO buffer may include an asynchronous symmetric pulse (asP*) protocol FIFO buffer.

Moreover, the slow mode may have multiple cycle times that are less than the data-transfer period and that are selectable by the control logic during operation.

Furthermore, the initialization may ensure that dropped edges in at least one of the sender clock and the receiver clock are avoided during the normal mode.

Another embodiment provides a computer-readable medium that contains data representing the source-synchronization interface circuit.

Another embodiment provides an integrated circuit that includes the source-synchronization interface circuit.

Another embodiment provides a computer system that includes the integrated circuit.

Another embodiment provides a method for operating the source-synchronization interface circuit.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a source-synchronization interface circuit (which is sometimes referred to as a 'deskew first-in, first-out or FIFO buffer'), an integrated circuit that includes the source-synchronization interface circuit, a system that includes the source-synchronization interface circuit and a technique for operating the source-synchronization interface circuit are described. The source-synchronization interface circuit includes: a sender synchronous-to-asynchronous protocol converter that receives sender data and a sender clock and that has regenerative gain to resolve metastability during phase synchronization of the sender clock and a receiver clock; an asynchronous FIFO buffer with multiple stages that conveys phase information and data from the sender synchronous-to-asynchronous protocol converter to a receiver synchronous-to-asynchronous protocol converter; and the receiver synchronous-to-asynchronous protocol converter that receives the receiver clock and that has regenerative gain to resolve metastability during the phase synchronization. Moreover, the source-synchronization interface circuit includes control logic. The control logic initializes the source-synchronization interface circuit by operating at least some of the stages in the asynchronous FIFO buffer in a slow mode having a cycle time less than a data-transfer period for the predetermined number of clock cycles, and subsequently operating at least some of the stages in a normal mode having a cycle time that is less than that for the slow mode.

By phase synchronizing the sender clock and the receiver clock, the source-synchronization interface circuit ensures that dropped edges in at least one of the sender clock and the receiver clock are avoided during the normal mode. More generally, the source-synchronization interface circuit may resolve metastability between the sender clock and the receiver clock over a wide range of clock periods and phases. In addition, the source-synchronization interface circuit eliminates the need for custom, dynamic logic and continuously adjustable delay lines. Consequently, the source-synchronization interface circuit may improve the performance of systems that include the source-synchronization interface circuit and may reduce the cost of these systems.

Figure 1:
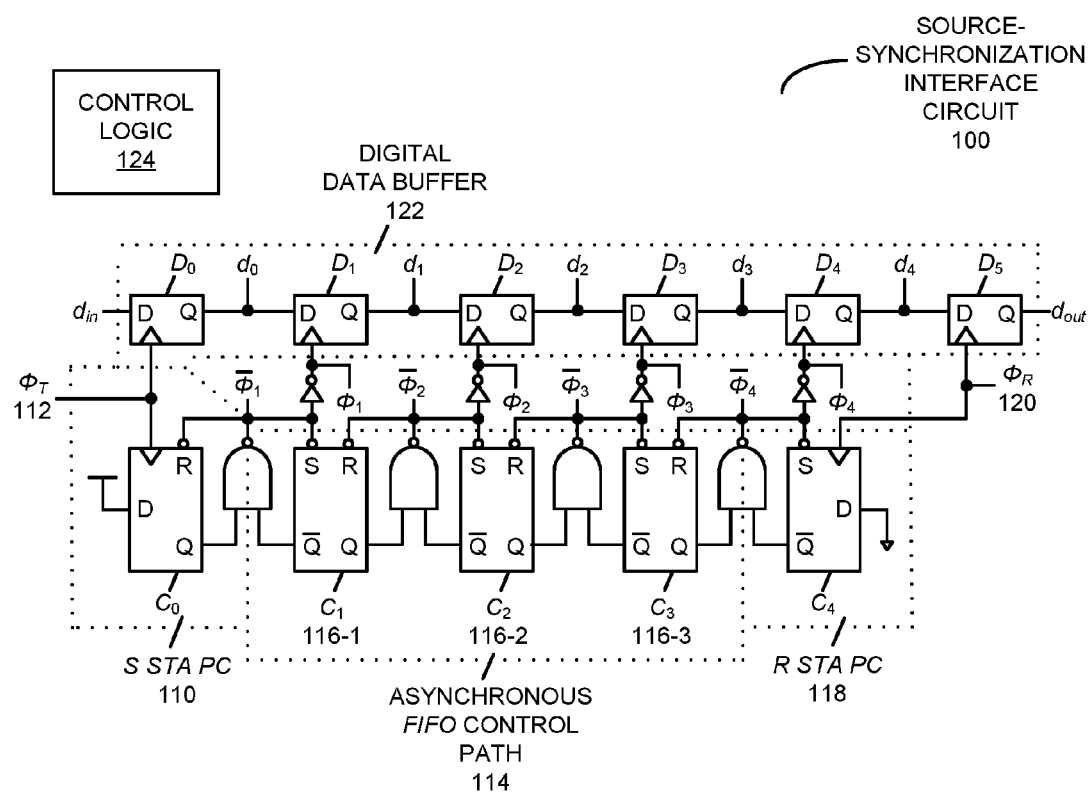
FIG. 1 is a block diagram illustrating a source-synchronization interface circuit in accordance with an embodiment of the present disclosure.

We now describe embodiments of the source-synchronization interface circuit. FIG. 1 presents a block diagram illustrating a source-synchronization interface circuit 100. This source-synchronization interface circuit includes a sender synchronous-to-asynchronous protocol converter (S STA PC) 110 that, during operation, receives a sender clock ($\Phi_T$) 112 having a first period and a sender phase, where sender synchronous-to-asynchronous protocol converter 110 has regenerative gain (positive feedback) to resolve metastability during phase synchronization of sender clock 112 and a receiver clock ($\Phi_R$) 120.

Moreover, source-synchronization interface circuit 100 includes an asynchronous FIFO control path 114 electrically coupled to sender synchronous-to-asynchronous protocol converter 110, where asynchronous FIFO control path 114 includes multiple stages ($C_1$-$C_3$) 116. Furthermore, source-synchronization interface circuit 100 includes a receiver synchronous-to-asynchronous protocol converter (R STA PC) 118, electrically coupled to asynchronous FIFO control path 114, which, during operation, receives a receiver clock 120 having a second period, which is one of the first period and a rational multiple of the first period, and a receiver phase, where receiver synchronous-to-asynchronous protocol converter 118 has regenerative gain to resolve metastability during the phase synchronization. Note that asynchronous FIFO control path 114 conveys information corresponding to the sender phase to receiver synchronous-to-asynchronous protocol converter 118 and information corresponding to the receiver phase to sender synchronous-to-asynchronous protocol converter 110. Moreover, data is transferred from the sender to source-synchronization interface circuit 100, and from source-synchronization interface circuit 100 to the receiver with a data-transfer period that is the same as one of the first period and the rational multiple of the first period.

Additionally, source-synchronization interface circuit 100 includes: a digital data buffer 122, electrically coupled to asynchronous FIFO control path 114, which, during operation, conveys data based on output signals from stages 116 in asynchronous FIFO control path 114; and control logic 124, electrically coupled to asynchronous FIFO control path 114. (Note that a FIFO buffer may include FIFO control path 114 and digital data buffer 122. The asynchronous FIFO control path 114 produces derived clock signals ($\phi_1$, $\phi_2$, $\phi_3$, and $\phi_4$ in FIG. 1) that control transfer of data values between registers in digital data buffer 122. More generally, the control path may produce N such clock signals, and digital data buffer 122 may hold up to N distinct values in addition to any values held in the sender's output register $D_0$ and the receiver's input register $D_5$ in the FIG. 1 (and, more generally, $D_{N+1}$). We say that such a source-synchronization interface circuit includes an N stage FIFO.) During operation, control logic 124 initializes source-synchronization interface circuit 100 by: operating stages 116 in asynchronous FIFO control path 114 in a slow mode having a cycle time less than a data-transfer period for a predetermined number of clock cycles (such as N or more clock cycles and, more generally, a sufficient number of clock cycles to ensure proper operation of source-synchronization interface circuit 100); and subsequently operating stages 116 in asynchronous FIFO control path 114 in a normal mode having a cycle time that is less than that for the slow mode.

Note that, during the initialization, control logic 124 may operate all of stages 116 in asynchronous FIFO control path 114 in the slow mode for N or more clock cycles. Moreover, the initialization may ensure that digital data buffer 122 is approximately half full. Then, during normal operation, source-synchronization interface circuit 100 may operate to avoid overflow or underflow.

Furthermore, source-synchronization interface circuit 100 may include FIFO buffers (such as stages 116) between sender synchronous-to-asynchronous protocol converter 110 and receiver synchronous-to-asynchronous protocol converter 118. Note that stages 116 may increase the skew tolerance of source-synchronization interface circuit 100.

In some embodiments, sender synchronous-to-asynchronous protocol converter 110 and receiver synchronous-to-asynchronous protocol converter 118 are each half of a phase-frequency detector.

Note that asynchronous FIFO control path 114 may include an asynchronous symmetric pulse (asP*) protocol FIFO buffer. However, source-synchronization interface circuit 100 may include or use another self-timed pipelining technique. Additionally, asynchronous FIFO control path 114 may include an asynchronous ripple FIFO buffer other than the asP* protocol FIFO buffer.

Moreover, the slow mode may have multiple cycle times that are less than the data-transfer period and that are selectable by control logic 124 during operation.

Furthermore, the initialization may ensure that dropped edges in at least one of sender clock 112 and receiver clock 120 are avoided during the normal mode.

In source-synchronization interface circuit 100, each of stages 116 includes a control flip-flop and a data register. During operation, if the control flip-flop is set, then the data register holds a value, and the stage is said to be full. Conversely, if the control flip-flop is reset, then the stage is said to be empty. A full stage may be referred to as 'holding a token' and an empty stage may be referred to as 'holding a bubble.' If stage i−1 holds a token and stage i holds a bubble, then Φi goes high, loading the value from $D_{i-1}$ into $D_i$, setting control flip-flop $C_i$, and resetting $C_{i-1}$. Thus, the token moves from stage i−1 to stage i, and the bubble moves from stage i to stage i−1. In this design, the sender attempts to insert a token into (and remove a bubble from) source-synchronization interface circuit 100 at each rising edge of $\Phi_T$ by setting control flip-flop $C_0$. (Note, if the period of the sender clock, $\Phi_T$, is a rational multiple of the period of the receiver clock, $\Phi_R$, then these insert or remove operations may be performed only on a certain fraction of the clock events in accordance with the rational ratio of these periods.) Similarly, the receiver attempts to remove a token from (and insert a bubble into) source-synchronization interface circuit 100 at each rising edge of $\Phi_R$ by resetting control flip-flop $C_N$. If source-synchronization interface circuit 100 neither overflows nor underflows, all of these operations succeeded.

Note that stages 116 in source-synchronization interface circuit 100 include phase-frequency detectors (PFDs) that function as edge-triggered C-elements. For example, a given phase-frequency detector can be implemented using two edge-triggered flip-flops and a NAND gate. For correct operation, the right flip-flop of $PFD_i$ should always be in the opposite state as the left flip-flop of $PFD_{i+1}$. In other words, half of the flip-flops are redundant. Consequently, these redundant flip-flops are removed from source-synchronization interface circuit 100.

Figure 2:
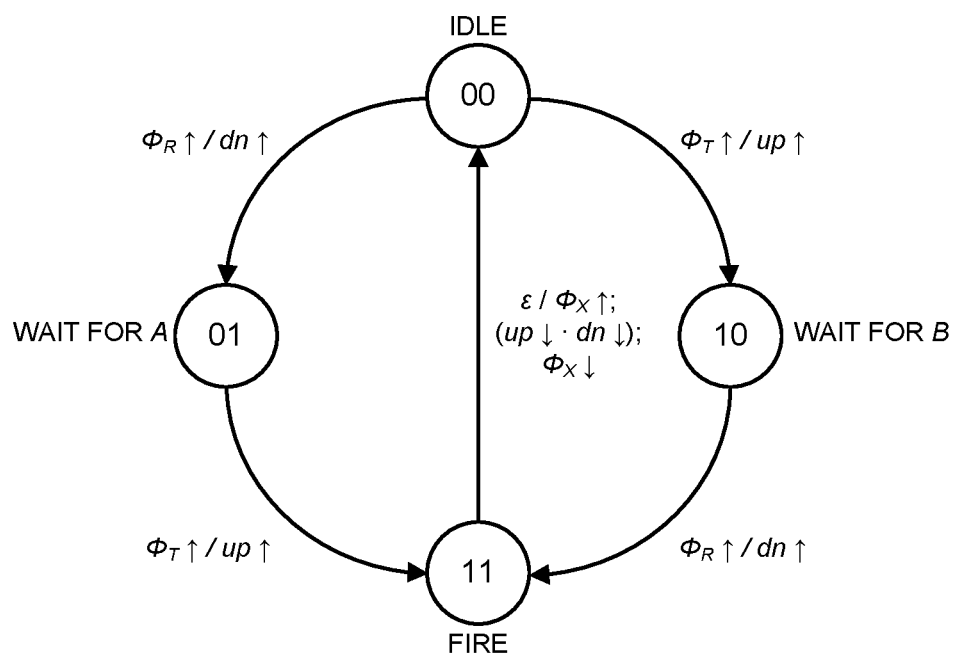
FIG. 2 is a state diagram for a phase-frequency detector in the source-synchronization interface circuit of FIG. 1 in accordance with an embodiment of the present disclosure.

FIG. 2 presents a state diagram for a phase-frequency detector in source-synchronization interface circuit 100 (FIG. 1). Starting from the idle state, the phase-frequency detector may wait until it has seen rising edges on $\Phi_T$ and $\Phi_R$, at which point it may generate a rising edge on $\Phi_x$ and return to the idle state, resetting the up, dn, and $\Phi_x$ signals as it does so. The notation up ↑*dn↑ indicates that the two signals make their downward transitions concurrently. The labels inside each state circle in FIG. 2 (e.g., '00' for state idle) indicate the state of up and dn signals in a phase-frequency detector in a stage in source-synchronization interface circuit 100 (FIG. 1). Note that the names up and dn arise from the traditional use of phase-frequency detectors in phase-locked loops. In particular, up indicates that a phase-locked loop oscillator increases in frequency, and dn indicates that it decreases.

Figure 3:
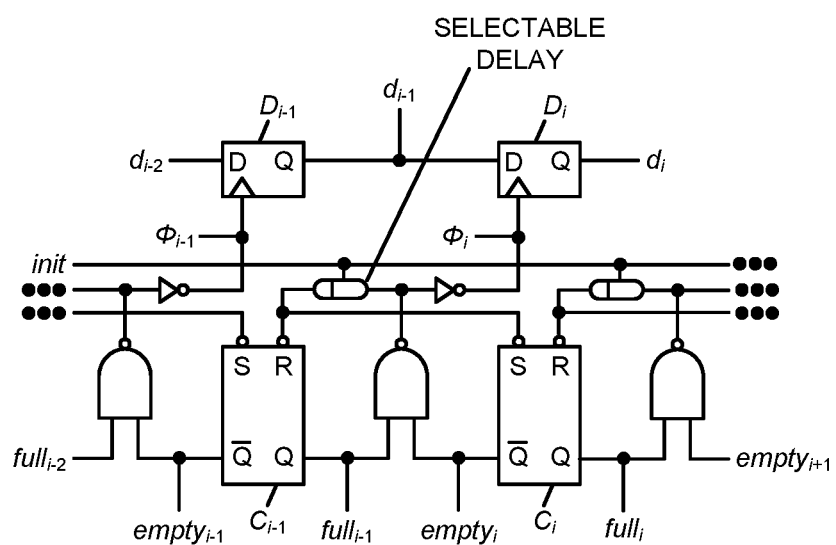
FIG. 3 is a drawing illustrating initialization of the source-synchronization interface circuit of FIG. 1 in accordance with an embodiment of the present disclosure.

In order to initialize source-synchronization interface circuit 100 (FIG. 1), each of stages 116 (FIG. 1) may be modified to include a variable delay line with at least two settings, fast and slow. For example, the variable delay line can be implemented using a multiplexer and a chain of buffers. This is shown in FIG. 3, which presents a drawing illustrating initialization of source-synchronization interface circuit 100 (FIG. 1). In particular, the slow mode may be used for initialization, and the fast mode may be used for normal operation. Note that the slow mode may restrict the range of latencies that are feasible for source-synchronization interface circuit 100. If this range is wider than one clock period, then source-synchronization interface circuit 100 can be operated initially in the slow mode and, given sufficient time, it will reach a latency in this latency range. However, source-synchronization interface circuit 100 may be at the very edge of this range (i.e., nearly empty or nearly full), and any subsequent change in the delays may cause a failure. For normal operation, the extra delay is removed. This increases the latency range of source-synchronization interface circuit 100 by both lowering the minimum latency (i.e., the fall-through time for an empty FIFO) and increasing the maximum latency (i.e., the maximum occupancy times the clock period), and ensures that source-synchronization interface circuit 100 can tolerate subsequent timing variations. Moreover, this allows the initialized source-synchronization interface circuit 100 to tolerate changes in the relative skew between the sender and receiver equal to the total decrease in the delays for all of stages 116 (FIG. 1). Thus, by running source-synchronization interface circuit 100 in the slow mode, it can find the operating conditions that ensure tolerance of timing variations in the normal mode.

In an exemplary embodiment, the source-synchronization interface circuit provides a mesochronous deskew FIFO. This deskew FIFO may be implemented using an all-digital, multi-stage design (e.g., using standard components in circuit-design libraries) that can be simply initialized. In particular, the deskew FIFO may be operated with increased delay in the handshake circuitry for a predetermined number of cycles, and this delay may be bypassed for normal operation. For example, the initialization may be implemented by a multiplexer that chooses between a normal, direct path for the control signals and a delayed version of the control signals. Moreover, very little coordination may be required between the sender and receiver to perform the initialization. Instead, it is sufficient that the sender clock operates at the intended frequency during initialization and onward.

Moreover, the deskew FIFO addresses metastability issues that can arise during the initialization such that the deskew FIFO can have guaranteed tolerance of skew drift under worst-case conditions. The deskew FIFO may be suitable for global interconnect applications and ratiochronous interfaces in which the sender and receiver clock frequencies are rational multiples of each other. Furthermore, for the common case where the sender and receiver clocks have identical frequency but arbitrary skew, the mesochronous deskew FIFO can achieve deskew with a smaller FIFO and lower latency than existing source-synchronization interface circuits.

We now discuss the timing constraints that determine the range of relative phase offsets between the sender clock and the receiver clock for correct operation of the source-synchronization interface circuit. This interval of acceptable phase offsets may be determined by the round-trip latency of the source-synchronization interface circuit, e.g., N+1 clock periods when an N-stage asP* FIFO is used, minus the sum of the forward and backward fall-through times of the FIFO. If this interval is wider than one clock period, then the source-synchronization interface circuit can be initialized to work with any initial phase offset. Wider skew-tolerance windows may allow the source-synchronization interface circuit to operate robustly even if the relative phase offset changes after initialization. First, we derive these bounds and present the notation used throughout the timing analysis. Then, we discuss a simple initialization technique that avoids analog delay lines. In particular, as discussed previously, a digitally controlled delay in each stage can be set to one of two different values. This may be sufficient to achieve a guaranteed worst-case tolerance of skew drift. While a continuously adjustable delay-line can achieve greater tolerance of drift in non-worst-case scenarios, the worst-case is usually the concern of designers, and the all-digital approach disclosed may be roughly equivalent to the analog one for tolerance of skew drift given the worst-case initial skew. Next, we discuss issues of metastability, including analyzing the timing requirements for the control path. Note that it is assumed that the source-synchronization interface circuit satisfies the timing constraints. Consequently, in the discussion that follows, the focus is on the timing constraints required for proper operation in a mesochronous context.

In order to establish the skew tolerance of the source-synchronization interface circuit, the minimum and maximum latencies of the source-synchronization interface circuit are determined assuming that the sender inserts one datum and the receiver removes one datum every clock period. In this discussion, the delay model for the source-synchronization interface circuit and constraints for the clock period (Eqn. 1) and latency (Eqn. 4) are defined. As described further below with reference to Theorem 1, if these constraints are satisfied, there is a valid schedule of operations for the source-synchronization interface circuit such that all data values are successfully transferred from the sender, through the source-synchronization interface circuit, to the receiver. Note that Theorem 1 assumes that the source-synchronization interface circuit has been initialized to have an occupancy that satisfies the latency bounds.

Source-synchronization interface circuit source-synchronization interface circuit 100 (FIG. 1) has six data registers, $D_0, \ldots D_5$, and five control flip-flops, $C_0, \ldots C_4$. More generally, a source-synchronization interface circuit with N FIFO stages may have N+2 data registers and N+1 control flip-flops. The following analysis focuses on the control path.

The Q output of flip-flop $C_i$ is denoted by qi. If qi is true, then stage i is said to be 'full,' and data register $D_i$ holds the associated data value. Conversely, if qi is false, then stage i is said to be 'empty,' indicating that the value in data register $D_i$ has already propagated to stage i+1 or further. It can be helpful to identify a correspondence between transmitter and receiver clock events. In order to do this, imagine that the transmitter sends an ascending sequence of consecutive integers, e.g., 0, 1, 2, . . . , and let T(k) denote the time of the rising edge of the transmitter clock that loads the value k into $D_0$. Similarly, let R(k) denote the time of the rising edge of the receiver clock that loads the value k into $D_{N+1}$.

Figure 4:
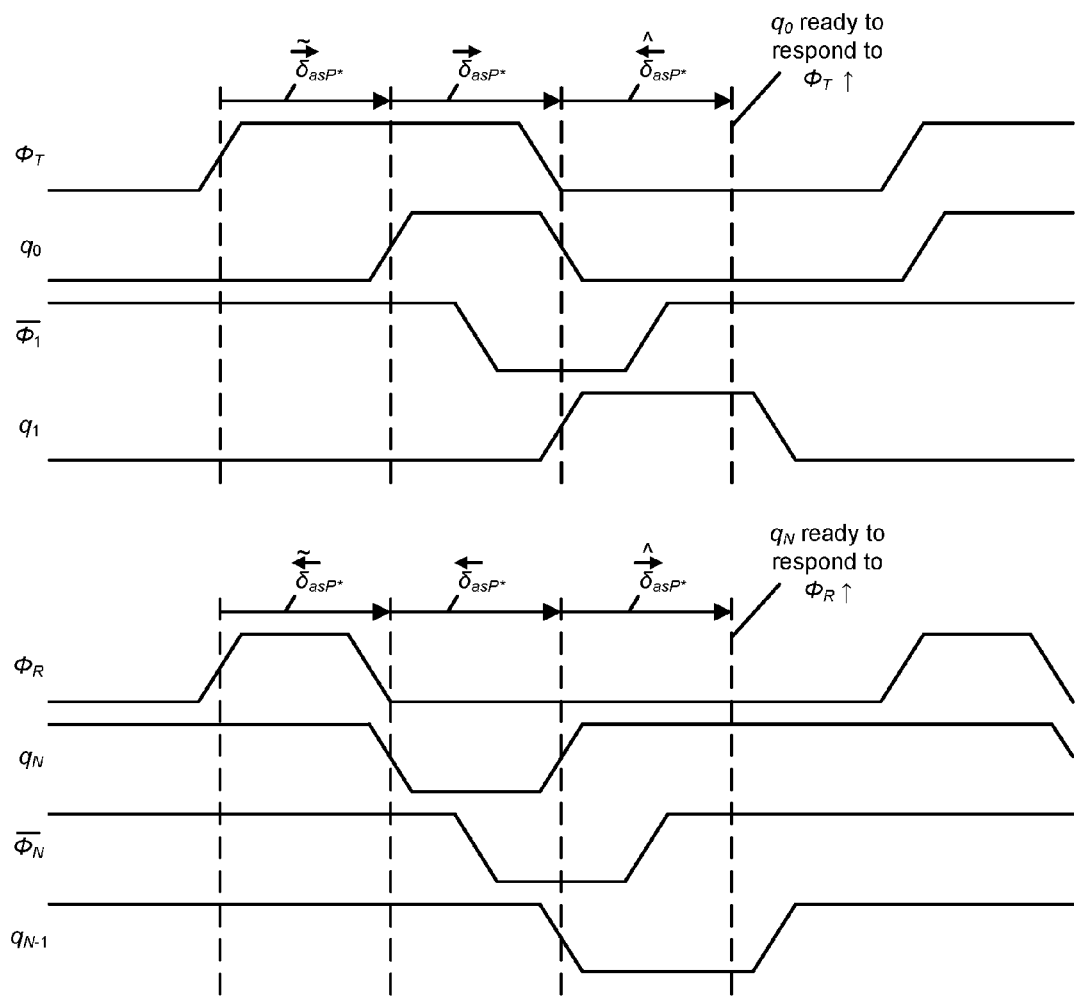
FIG. 4 is a timing diagram for the source-synchronization interface circuit of FIG. 1 in accordance with an embodiment of the present disclosure.

As shown in FIG. 4, which presents a timing diagram for source-synchronization interface circuit 100 (FIG. 1), let $\vec{\delta}_{asP*}$ denote the forward delay of an asP* stage. This is the delay from a rising edge of $q_i$ through the NAND gate to the rising subsequent edge of $q_{i+1}$, assuming that $q_{i+1}$ was false when $q_i$ made its low-to-high transition. In addition, there are special delays at the transmitter and receiver ends of the control path. Let $\vec{\delta}_{asP*}$ denote the time from a rising edge of $\Phi_T$ to the rising edge of $q_0$. When a token arrives at the final stage and sets $q_N$, the stage may need time to complete its reset cycle and recover before the next rising edge of $\Phi_R$. Moreover, let $\vec{\delta}_{asP*}$ denote the time to complete this reset and recovery. Note that the delays for the reverse path can be defined similarly.

Before defining the delays used in the analysis, note that when stage $C_{i-1}$ is full and stage $C_i$ is empty, the source-synchronization interface circuit may trigger a concurrent resetting of $C_{i-1}$ to empty and setting of $C_i$ to full. Furthermore, there are many 'little' events that happen in this process to form a low-going pulse on $\Phi_i$, along with internal signal transitions in the flip-flops. While modeling these events may not change the main line of reasoning in the following discussion, such modeling would make the arguments much more tedious and may restrict the analysis to a particular implementation. Instead, in the following discussion the firing of an asP* stage is viewed as an atomic event. In particular, the control path is modeled as if $q_i$ goes high and $q_{i-1}$ goes low at the same time.

Let $\delta_{asP*}$ denote the reverse delay of a stage, i.e., the time from $q_i$ going low (or, equivalently, $q_{i+1}$ going high) until goes low (or, equivalently, $q_i$ goes high) assuming that $q_{i-1}$ was high when $q_i$ made its high-to-low transition. Note that $q_{N+1}$ is reset by a rising edge of $\Phi_R$. Moreover, let $\tilde{\delta}_{asP*}$ denote the time from a rising edge of $\Phi_R$ to the falling edge of $q_{N+1}$. Furthermore, let $\hat{\delta}_{asP*}$ denote the minimum delay from a falling transition on $q_0$ until a subsequent rising edge of $\Phi_T$, which can be captured by setting $q_0$ high again.

We now present bounds for the cycle time and latency of the source-synchronization interface circuit. Theorem 1 then shows that these bounds are sufficient to allow safe operation of the source-synchronization interface circuit, i.e., operation where every insert operation by the sender and every remove operation by the receiver succeeds.

Unless otherwise noted, delays of circuit components refer to their upper bounds. If an expression involving delays of circuit components is written [:::]min, then the lower bounds for circuit element delays are used. Conversely, the clock period (P) denotes by default the minimum, cycle-to-cycle period, and [P]max indicates the maximum possible value. Moreover, $\vec{\delta}_{asP*}$ and $\tilde{\delta}_{asP*}$ are both assumed to be positive (i.e., causality). Furthermore, $\vec{\delta}_{asP*}$ and $\hat{\delta}_{asP*}$ are both assumed to be positive because that is reasonable and it avoids special cases.

The cycle-time for an asP* stage, $\vec{\delta}_{asP*} + \tilde{\delta}_{asP*}$ must be less than the clock period. Otherwise, the source-synchronization interface circuit may be unable to keep up with the flow of data. Moreover, an extra constraint occurs at each end. When the transmitter inserts a token into stage $C_0$, this token must propagate to stage $C_1$, and stage $C_0$ must 'recover' from the reset before the next rising edge of $\Phi_T$. This yields the constraint $P > \vec{\delta}_{asP*} + \vec{\delta}_{asP*} + \hat{\delta}_{asP*}$. A similar constraint occurs at the receiver. These cycle-time constraints are summarized by $$P > \max(\vec{\delta}_{asP*} + \tilde{\delta}_{asP*}, \vec{\delta}_{asP*} + \vec{\delta}_{asP*} + \hat{\delta}_{asP*}, \tilde{\delta}_{asP*} + \tilde{\delta}_{asP*} + \vec{\delta}_{asP*}). \quad (1)$$

Furthermore, a token that is inserted into an empty pipeline at time T(k) sets $q_0$ no later than $T(k) + \vec{\delta}_{asP*}$ and sets $q_i$ no later than $T(k) + \vec{\delta}_{asP*} + i \cdot \vec{\delta}_{asP*}$ for $0 \le i \le N$. Likewise, $\vec{\delta}_{asP*}$ time units after $q_N$ is set, flip-flop $C_N$ is ready to respond to the next rising edge of $\Phi_R$ and deliver token k to the receiver. These bounds are tight if every stage incurs the maximum delay for each operation and yield a lower bound on the source-synchronization interface circuit latency of $$R(K) - T(K) \ge \vec{\delta}_{asP*} + N \cdot \vec{\delta}_{asP*} + \vec{\delta}_{asP*}. \quad (2)$$

Additionally, a rising edge of $\Phi_R$ inserts a bubble into the control path. Consider the propagation of such a bubble when inserted into the full source-synchronization interface circuit. In response to $\Phi_R$ going high at time R(K), $q_N$ may go low no later than $R(k) + \tilde{\delta}_{asP*}$. For $N > i \ge 0$, the bubble inserted at time R(K) enables $q_i$ to go low no later than $R(k) + \tilde{\delta}_{asP*} + (N-i) \cdot \tilde{\delta}_{asP*}$, and this falling edge of $q_i$ occurs with the rising edge of $q_{i+1}$ that receives token k+N−i. Thus, the bubble inserted at time R(k) may reset $q_0$ no later than $R(k) + \tilde{\delta}_{asP*} + N \cdot \tilde{\delta}_{asP*}$. When the reset cycle is complete, control flip-flop $C_0$ will be ready to receive token k+N+1. Therefore, $$R(K) - T(K) \le P + N \cdot (P - \tilde{\delta}_{asP*}) - \tilde{\delta}_{asP*} - \hat{\delta}_{asP*}. \quad (3)$$

Let $\lambda = R(k) - T(k)$ denote the latency of the source-synchronization interface circuit. After combining Eqns. 2 and 3, proper operation of the source-synchronization interface circuit requires $$\lambda_{min} < \lambda < \lambda_{max}, \quad (4)$$

where $\lambda_{min} = \vec{\delta}_{asP*} + \vec{\delta}_{asP*} + \vec{\delta}_{asP*}$ and $\lambda_{min} = P + N \cdot (P - \tilde{\delta}_{asP*}) - \tilde{\delta}_{asP*} - \hat{\delta}_{asP*}$.

In order to show that the source-synchronization interface circuit can operate properly if the period bounds from Eqn. 1 and the latency bounds from Eqn. 4 are satisfied, a 'schedule' (sched) for operation of the source-synchronization interface circuit is proposed. We will then prove that it is maintained by the transmitter and the receiver in the source-synchronization interface circuit. In the discussion that follows, a simplified initialization process brings the source-synchronization interface circuit to a state satisfying this schedule is described. For $0 \le i \le N$, let $t_i(k)$ denote the time that $q_i$ goes high in response to the $k^{th}$ token from the transmitter. Define $t_{N+1}(k) = R(k) + \tilde{\delta}_{asP*}$. Moreover, note that, intuitively, $t_{N+1}(k)$ is the time that a fictitious stage N+1 acquires the $k^{th}$ token from the transmitter. Furthermore, let $$\text{sched}(i,k,l) = \max(\vec{\delta}_{asP*} + i \cdot \vec{\delta}_{asP*}, \lambda + \tilde{\delta}_{asP*} - (N-(i-1)) \cdot (P - \tilde{\delta}_{asP*}), \quad (5)$$

where $\lambda$ is taken to be clear from the context.

Theorem 1 below shows that the schedule defined by Eqn. 5 is an invariant of the source-synchronization interface circuit, sender and receiver. Stated differently, if the source-synchronization interface circuit ever reaches a state where this schedule is satisfied, it will continue to satisfy it from then on. Furthermore, Theorem 1 shows that when this schedule is satisfied, all insert operations by the sender, and all remove operations by the receiver will succeed.

Theorem 1: Given a clock period P that satisfies Eqn. 1, and an integer $k_0$ and latency $\lambda$, with $\lambda = R(k_0) - T(k_0)$ and where $\lambda$ satisfies Eqn. 4, such that $$\forall 0 \le i \le N : t_i(k_0) \le \text{sched}(i, k_0, \lambda).$$

Then, $\forall k \ge k_0$, $$\forall 0 \le i \le N : t_i(k) \le \text{sched}(i, k, \lambda),$$

$$t_1(k) + \hat{\delta}_{asP*} \le T(k+1) \text{ and}$$

$$t_N(k) + \vec{\delta}_{asP*} \le R(k).$$

The first clause of Theorem 1 says that the source-synchronization interface circuit maintains the proposed schedule. The second clause says that stage $C_0$ completes its reset operation in time to receive the next token from the transmitter. The third clause says that stage $C_N$ completes its set operation in time to receive the next bubble from the receiver.

Moreover, Theorem 1 shows that if the source-synchronization interface circuit ever reaches a state satisfying the schedule from Eqn. 5, then the source-synchronization interface circuit is guaranteed to operate properly from then on. The discussion that follows presents a simplified initialization technique that ensures the source-synchronization interface circuit may reach such a state. In particular, run the source-synchronization interface circuit with some extra delays for a small number of cycles, and then run it at full speed after that.

Figure 5:
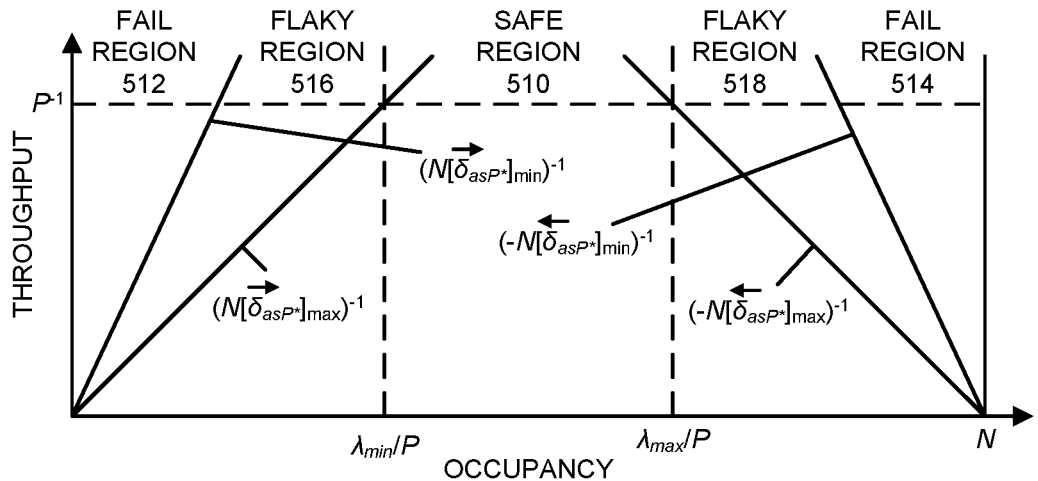
FIG. 5 is a drawing illustrating operating regions of the source-synchronization interface circuit of FIG. 1 in accordance with an embodiment of the present disclosure.

This approach is illustrated in FIG. 5, which presents a drawing showing different operating regions of the source-synchronization interface circuit. Note that the throughput of a handshaking ring can be expressed in terms of the forward and backward delays of the handshake, the number of stages in the ring, and the occupancy in the ring. Therefore, for the source-synchronization interface circuit, the throughput may be fixed by the clock period, and the occupancy is the same as the latency divided by the clock period. Consequently, the source-synchronization interface circuit can be characterized by the intersection of the aforementioned throughput with line throughput equal to $P^{-1}$.

Note that FIG. 5 illustrates the operation of the source-synchronization interface circuit without the switchable delays. (In FIG. 5, note that the lines are labeled with their slopes.) Safe region 510 is where the source-synchronization interface circuit can operate correctly with any delays, including the maximums. If the width of safe region 510 at the throughput equal to $P^{-1}$ is at least one (i.e., $\lambda_{max} - \lambda_{min} \geq P$), then there will be some latency for which the source-synchronization interface circuit can operate correctly. However, in fail region 512 remove operations will fail because there are not enough tokens in the source-synchronization interface circuit to propagate from the sender to the receiver, even if all operations complete with their minimum delays. For each cycle that a remove fails but the insert succeeds, the occupancy of the source-synchronization interface circuit will increase by one, thus moving the source-synchronization interface circuit out of fail region 514. Similarly, fail region 514 is where insert operations will fail because there are insufficient bubbles in the source-synchronization interface circuit, and such failures move the occupancy to the left. Flaky regions 516 and 518 are where insert and remove operations may succeed or fail, depending on the actual delays of the stages in the source-synchronization interface circuit. One concern is that during initialization, the source-synchronization interface circuit may settle in one of flaky regions 516 and 518 because the source-synchronization interface circuit exhibits fast operations (e.g., because of a relatively high Vdd). Note that, after initialization, these operating conditions may change, and one or more insert or remove operations may fail.

Figure 6:
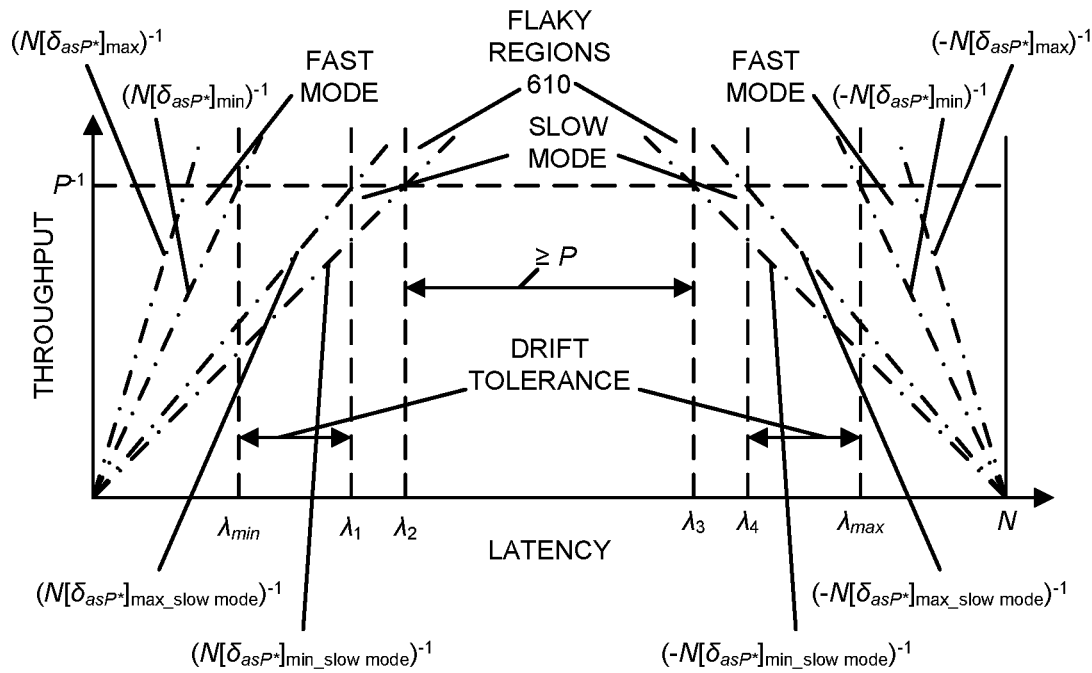
FIG. 6 is a drawing illustrating operating regions of the source-synchronization interface circuit of FIG. 1 in accordance with an embodiment of the present disclosure.

FIG. 6, which presents a drawing showing different operating regions of the source-synchronization interface circuit with switchable delays, illustrates an approach that ensures that the source-synchronization interface circuit is operating in safe region 510 (FIG. 5) at the end of the initialization process. In particular, operating the source-synchronization interface circuit with extra delay shifts flaky regions 516 and 518 in FIG. 5 inwards. In FIG. 6, the flaky regions for the slow mode are flaky regions 610. The safe region for the slow mode of the source-synchronization interface circuit has $\lambda_2 \leq \lambda \leq \lambda_3$. If this region is at least as wide as the clock period, then for any initial skew between the sender and receiver, there is a valid latency for the slow mode of the source-synchronization interface circuit, and initialization procedure will succeed. At the end of initialization, the source-synchronization interface circuit is guaranteed to have a latency, $\lambda$ with $\lambda_1 \leq \lambda \leq \lambda_4$. As described previously, this does not guarantee safe operation in the slow mode. However, when the source-synchronization interface circuit switches to the fast mode, then the source-synchronization interface circuit will be safely inside its operating region. The gap between $\lambda_{min}$ and $\lambda_1$ and the gap between $\lambda_4$ and $\lambda_{max}$ provide a safety margin for any drift in the skew after initialization.

Therefore, source-synchronization interface circuit 100 (FIG. 1) is extremely simple to initialize. First, operate it in the slow mode for 2·N clock cycles, then operate it in the normal mode for N+M cycles, where M is the number of cycles allocated for metastability resolution (as described below). In the first N cycles in the slow mode, the sender will attempt to insert N new data values into the FIFO. If an insert does not succeed, this means that stage 0 is full or had been full within the past $\hat{\delta}_{asP*}$ time units. Thus, there was already a token in the FIFO. Similar arguments show that, if the $i^{th}$ insert does not succeed, there is a chain of i tokens in the FIFO that caused the blockage, with the observation that some of these may have already reached the far end of the FIFO and been removed by operations of the receiver. At the end of these N cycles, there may be one token whose insertion was delayed by one clock period because of an earlier token that had moved from stage 0 to stage 1 in the previous $\hat{\delta}_{asP*}$ time units. This creates a 'gap' in the FIFO that could cause a remove to fail. Any such failure must occur within the next N cycles. Similar observations apply for bubbles. Therefore, 2·N cycles are sufficient to ensure that the FIFO holds sufficient tokens and bubbles to operate in the slow mode if the delays for operations had no variation.

When the FIFO is switched to the normal mode, it may be the case that some tokens had propagated at a faster rate than others due to the gap between $[\vec{\delta}_{asP*}]_{min}$ and $[\vec{\delta}_{asP*}]_{max}$. An extreme scenario would be if one token had been propagating across the FIFO at the fastest possible rate for the slow mode, and the remaining tokens propagated at the slowest possible rate for the slow mode. This could cause large gaps between tokens such that a subsequent remove operation could fail. Note that there are enough tokens in the FIFO for correct operation in the normal mode, but some have not propagated far enough because the FIFO had been operating in the slow mode. Because there are at most N tokens in the FIFO, all of these 'slow mode' tokens are removed within N cycles. If a remove fails, then the number of tokens in the FIFO will increase and the number of bubbles will each decrease by one, but the numbers of tokens and bubbles will continue to satisfy the conditions for a valid schedule. Within N cycles, all tokens and bubbles in the FIFO will have been inserted during normal-mode operation, and they will satisfy all the requirements for Theorem 1, so the FIFO will be properly initialized.

Because a small FIFO can achieve skew and drift tolerances of several clock periods, N may typically be small, and the initialization can be performed quickly. Note that very little coordination is needed between circuits in different clock domains. The initialization time needs to be long enough to account for any difference of when the two clocks start at the source-synchronization interface circuit. Because the initialization works from any state, there is no need to gate these clocks. They can initially be ill-defined. The receiver just needs to operate its source-synchronization interface circuit in the slow mode long enough to ensure that it has had at least 2·N good cycles of both clocks. (However, note that this is a bound and it may be possible to operate in the slow mode for fewer cycles.) Furthermore, the sender may wait a little longer than that before sending valid data to ensure that the receiver is listening. Once the source-synchronization interface circuit is initialized, it can tolerate an advance of $\Phi_T$ with respect to $\Phi_R$ compared with their relation during initialization of up to $$[P+N\cdot(P-\hat{\vec{\delta}}_{asP*}-\hat{\vec{\delta}}_{asP*})]_{min}-[\lambda_{max}]_{max,slow}$$

time units or equivalently a delay of $\Phi_T$ with respect to $\Phi_R$ of up to $$[\vec{\delta}_{asP*}+N\cdot\vec{\delta}_{asP*}+\vec{\delta}_{asP*}]_{min,slow}-[\lambda_{min}]_{max}$$

time units after any initial conditions and any initial phase offset. Thus, a designer can increase the tolerance to changes in operating conditions and the resulting changes of clock skew by increasing the amount of extra delay in the slow mode and/or by increasing the number of stages in the source-synchronization interface circuit.

In terms of metastability, assume that the flip-flops in stages 0 and N have metastable behaviors that are manifested as delayed output transitions. This means that the asP* stages see metastability as a delayed transition. Thus, the asP* stages may operate correctly, even in the presence of metastability. The failure mode is that an asP* handshake may reset $q_0$ or set $q_N$ late enough so as to overlap the next sender or receiver clock event. Each such failure cycle is a low probability event, and waiting S clock cycles is similar to using an S flip-flop synchronizer. Consequently, it may be sufficient to wait a small number of cycles after switching the source-synchronization interface circuit to the fast mode, and metastability may resolve with a very low probability of failure. Note that, after initialization, metastability is precluded.

Another metastability scenario is quite contrived, although not impossible. The extra delay from a metastable flip-flop for $q_0$ could propagate through the source-synchronization interface circuit to cause a metastability failure in $q_N$. The delay for the second event could propagate back to $q_0$ and so on. This can only occur if $\lambda_{max}-\lambda_{min}<2P$. Again, waiting a small number of clock cycles after switching the source-synchronization interface circuit to the fast mode should resolve such metastability with high probability.

The preceding discussion presented a source-synchronization interface circuit. The design may be all-digital, and may be implemented using standard flip-flops and logic gates without any special 'asynchronous' cells, such as C-elements. Being based on an asP* pipeline, the source-synchronization interface circuit may be able to achieve high throughputs. Moreover, the source-synchronization interface circuit may be a mesochronous design, so the sender and receiver clocks operate at the same frequency. This allows the source-synchronization interface circuit to operate at low latency and without any metastability issues after initialization.

Figure 7:
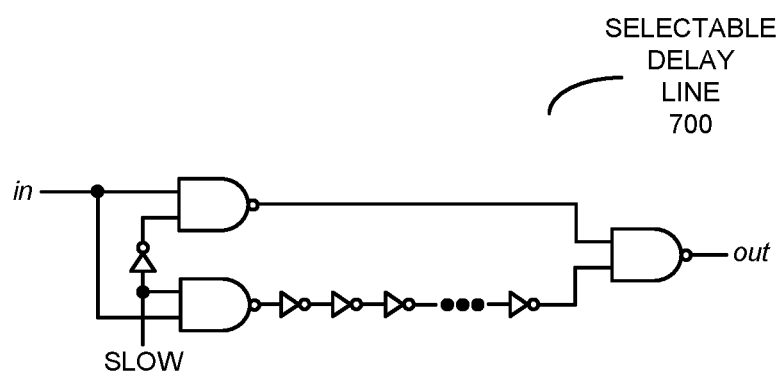
FIG. 7 is a block diagram illustrating a selectable delay line for use in the source-synchronization interface circuit of FIG. 1 in accordance with an embodiment of the present disclosure.

Furthermore, the initialization technique may be simple. In particular, each stage in the source-synchronization interface circuit may include a delay line with two settings, slow and fast. FIG. 7, which presents a block diagram of a selectable delay line 700, shows one possible implementation. In this delay line, a slow path consumes no dynamic power during normal operation. The source-synchronization interface circuit operates in the slow mode for initialization and in the fast mode for normal operation. This approach requires very little coordination between the sender and receiver. It is simply required that both clocks are operating at their nominal frequency for a moderate number of clock cycles during initialization before switching the source-synchronization interface circuit to the fast mode. This can be achieved by broadcasting an init signal to all clock domains that is locally synchronized and is used to indicate that initialization should be performed. Unlike existing source-synchronization interface circuits, the performance of this design is independent of mismatches on delays for the init signal. A mismatch of M cycles would simply require adding M cycles to the initialization time, and the source-synchronization interface circuit would achieve full performance with low latency during normal operation. After initialization, the source-synchronization interface circuit can tolerate changes in the relative clock skew between the sender and receiver. The amount of drift tolerance is equal to the sum over all of the stages of the delay differences between the slow and fast modes. For applications such as a global interconnect, the drift tolerance can be designed to be quite large at a cost of increasing the nominal latency by the drift tolerance.

Theorem 1 applies to a mesochronous design in which the skew tolerance is determined by finding the minimum and maximum latencies of the source-synchronization interface circuit for a given throughput. The source-synchronization interface circuit may converge to a valid operating state from any initial condition. The basic approach is to construct a schedule for token propagation in the source-synchronization interface circuit for which the actual timings converge to satisfy the schedule. The challenge is that the occupancy of the source-synchronization interface circuit and, thus, the latency can change because of failed insert or remove operations during initialization. While the preceding discussion used an asP* design as an illustration, the approach is based on the forward and reverse delays of the stages in the source-synchronization interface circuit. Thus, the approach can be implemented using other self-timed pipelining techniques.

Figure 8:
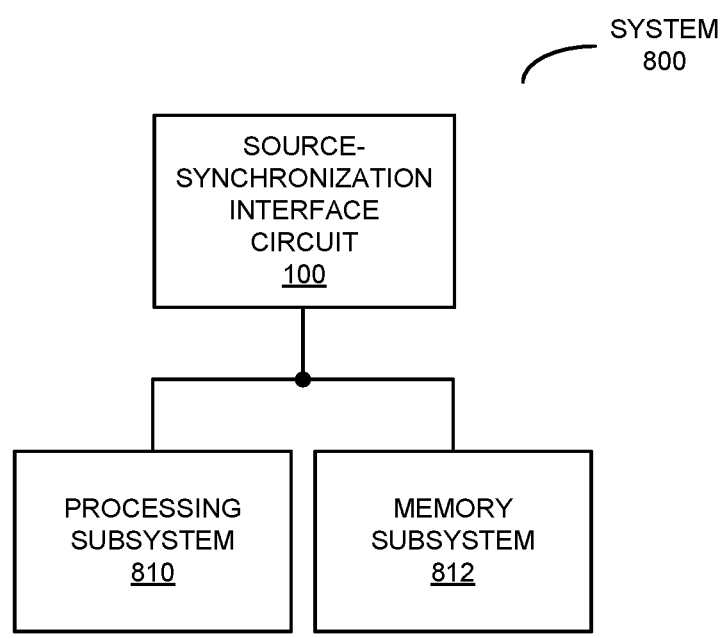
FIG. 8 is a block diagram illustrating a system that includes the source-synchronization interface circuit of FIG. 1 in accordance with an embodiment of the present disclosure.

The source-synchronization interface circuit can be used in a wide variety of systems and applications. FIG. 8 presents a block diagram illustrating a system 800 (such as a computer system) that includes source-synchronization interface circuit 100. In particular, source-synchronization interface circuit 100 may be included in an integrated circuit in system 800. In some embodiments, system 800 includes processing subsystem 810 (with one or more processors) and memory subsystem 812 (with memory).

In general, functions of the integrated circuit and system 800 may be implemented in hardware and/or in software. Thus, system 800 may include one or more program modules or sets of instructions stored in memory subsystem 812 (such as DRAM or another type of volatile or non-volatile computer-readable memory), which may be executed by processing subsystem 810. Note that the one or more computer programs may constitute a computer-program mechanism. Furthermore, instructions in the various modules in memory subsystem 812 may be implemented in: a high-level procedural language, an object-oriented programming language, and/or in an assembly or machine language. Note that the programming language may be compiled or interpreted, e.g., configurable or configured, to be executed by processing subsystem 810.

Components in system 800 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 800 may be at one location or may be distributed over multiple, geographically dispersed locations.

System 800 may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a smartwatch a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Note that a given computer system may be at one location or may be distributed over multiple, geographically dispersed locations.

Furthermore, the embodiments of source-synchronization interface circuit 100 and/or system 800 may include fewer components or additional components. Although these embodiments are illustrated as having a number of discrete items, these optical components, integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of source-synchronization interface circuit 100 and/or system 800 may be implemented more in hardware and less in software, or less in hardware and more in software, as is known in the art.

Figure 9:
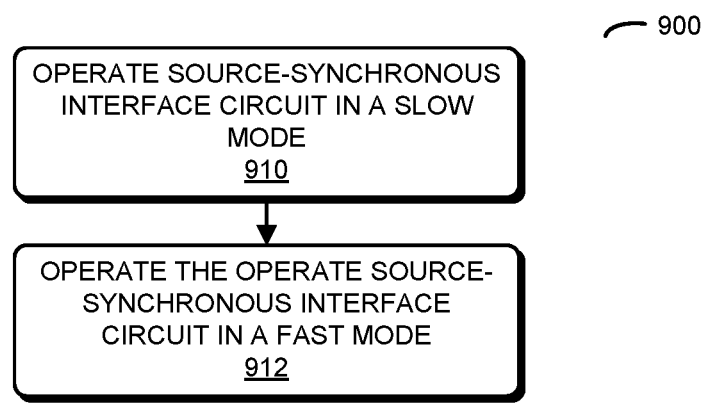
FIG. 9 is a flow chart illustrating a method for operating a source-synchronization interface circuit in accordance with an embodiment of the present disclosure.

We now describe embodiments of a method. FIG. 9 is a flow chart illustrating a method 900 for operating a source-synchronization interface circuit, such as source-synchronization interface circuit 100 (FIG. 1). During operation, the source-synchronization interface circuit is operated in a slow mode (operation 910) to initialize the source-synchronization interface circuit. Then, after the initialization, the source-synchronization interface circuit is operated in a fast mode (operation 912).

In some embodiments of method 900, there may be additional or fewer operations. For example, operation 912 may be conditionally performed after sufficient time with the source-synchronous interface circuit operated in the slow mode (i.e., operation 910) has elapsed to ensure robust operation. Moreover, the order of the operations may be changed, and/or two or more operations may be combined into a single operation.

In the preceding description, we refer to 'some embodiments.' Note that 'some embodiments' describes a subset of all of the possible embodiments, but does not always specify the same subset of embodiments.

While the preceding discussion illustrated embodiments of a source-synchronization interface circuit, more generally the disclosed techniques may be used in a synchronization block with handshaking protocol converters. For example, a circuit that provides a synchronous-to-asynchronous protocol converter and that has regenerative gain to resolve metastability can be used. Thus, while the source-synchronization interface circuit was illustrated with an asP* protocol FIFO buffer, more generally an asynchronous FIFO implemented using a variety of circuit protocols may be used. Furthermore, note that the selectable delay element in the source-synchronization interface circuit may be included in some or all of the stages in the asynchronous FIFO buffer.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A source-synchronization interface circuit, comprising:
a sender synchronous-to-asynchronous protocol converter that, during operation, receives sender data and a sender clock having a first period and a sender phase, wherein the sender synchronous-to-asynchronous protocol converter has regenerative gain to resolve metastability during phase synchronization of the sender clock and a receiver clock;
an asynchronous first-in, first-out (FIFO) buffer electrically coupled to the sender synchronous-to-asynchronous protocol converter, wherein the asynchronous FIFO buffer includes multiple stages and, during operation, conveys data from the sender synchronous-to-asynchronous protocol converter to a receiver synchronous-to-asynchronous protocol converter;
the receiver synchronous-to-asynchronous protocol converter, electrically coupled to the asynchronous FIFO buffer, which, during operation, receives a receiver clock having a second period, which is one of the first period and a rational multiple of the first period, and a receiver phase, wherein the receiver synchronous-to-asynchronous protocol converter has regenerative gain to resolve metastability during the phase synchronization, and
wherein the asynchronous FIFO buffer conveys information corresponding to the sender phase to the receiver synchronous-to-asynchronous protocol converter and information corresponding to the receiver phase to the sender synchronous-to-asynchronous protocol converter; and wherein the data is transferred from the sender to the source-synchronization interface circuit, and from the source-synchronization interface circuit to the receiver with a data-transfer period that is the same as one of the first period and the rational multiple of the first period; and
control logic, electrically coupled to the asynchronous FIFO buffer, which, during operation, initializes the source-synchronization interface circuit by:
operating at least some of the stages in the asynchronous FIFO buffer in a slow mode having a cycle time less than the data-transfer period for a predetermined number of clock cycles; and
subsequently operating at least some of the stages in the asynchronous FIFO buffer in a normal mode having a cycle time that is less than that for the slow mode.

2. The source-synchronization interface circuit of claim 1, wherein, during the initialization, the control logic operates all of the stages in the asynchronous FIFO buffer in the slow mode for the predetermined number of clock cyles.

3. The source-synchronization interface circuit of claim 1, wherein the initialization ensures that a digital data buffer in asynchronous FIFO buffer is approximately half full.

4. The source-synchronization interface circuit of claim 1, wherein the source-synchronization interface circuit includes FIFO buffers between the sender synchronous-to-asynchronous protocol converter and the receiver synchronous-to-asynchronous protocol converter.

5. The source-synchronization interface circuit of claim 1, wherein the sender synchronous-to-asynchronous protocol converter and the receiver synchronous-to-asynchronous protocol converter are each half of a phase-frequency detector.

6. The source-synchronization interface circuit of claim 1, wherein the asynchronous FIFO buffer includes an asynchronous ripple FIFO buffer.

7. The source-synchronization interface circuit of claim 1, wherein the asynchronous FIFO buffer includes an asynchronous symmetric pulse (asP*) protocol FIFO buffer.

8. The source-synchronization interface circuit of claim 1, wherein the slow mode has multiple cycle times that are less than the data-transfer period and that are selectable by the control logic during operation.

9. The source-synchronization interface circuit of claim 1, wherein the initialization ensures that dropped edges in at least one of the sender clock and the receiver clock are avoided during the normal mode.

10. A non-transitory computer-readable medium containing data representing a source-synchronization interface circuit, wherein the source-synchronization interface circuit includes:

a sender synchronous-to-asynchronous protocol converter that, during operation, receives sender data and a sender clock having a first period and a sender phase, wherein the sender synchronous-to-asynchronous protocol converter has regenerative gain to resolve metastability during phase synchronization of the sender clock and a receiver clock;

an asynchronous first-in, first-out (FIFO) buffer electrically coupled to the sender synchronous-to-asynchronous protocol converter, wherein the asynchronous FIFO buffer includes multiple stages and, during operation, conveys data from the sender synchronous-to-asynchronous protocol converter to a receiver synchronous-to-asynchronous protocol converter;

the receiver synchronous-to-asynchronous protocol converter, electrically coupled to the asynchronous FIFO buffer, which, during operation, receives a receiver clock having a second period, which is one of the first period and a rational multiple of the first period, and a receiver phase, wherein the receiver synchronous-to-asynchronous protocol converter has regenerative gain to resolve metastability during the phase synchronization, and wherein the asynchronous FIFO buffer conveys information corresponding to the sender phase to the receiver synchronous-to-asynchronous protocol converter and information corresponding to the receiver phase to the sender synchronous-to-asynchronous protocol converter; and wherein the data is transferred from the sender to the source-synchronization interface circuit, and from the source-synchronization interface circuit to the receiver with a data-transfer period that the same as one of the first period and the rational multiple of the first period; and control logic, electrically coupled to the asynchronous FIFO buffer, which, during operation, initializes the source-synchronization interface circuit by:

operating at least some of stages in the asynchronous FIFO buffer in a slow mode having a cycle time less than the data-transfer period for a predetermined number of clock cycles; and subsequently operating at least some of the stages in the asynchronous FIFO buffer in a normal mode having a cycle time that is less than that for the slow mode.

11. The non-transitory computer-readable medium of claim 10, wherein during the initialization, the control logic operates all of the stages in the asynchronous FIFO buffer in the slow mode for the predetermined number of clock cycles.

12. The non-transitory computer-readable medium of claim 10, wherein the initialization ensures that a digital data buffer in asynchronous FIFO buffer is approximately half full.

13. The non-transitory computer-readable medium of claim 10, wherein the source-synchronization interface circuit includes FIFO buffers between the sender synchronous-to-asynchronous protocol converter and the receiver synchronous-to-asynchronous protocol converter.

14. The non-transitory computer-readable medium of claim 10, wherein the sender synchronous-to-asynchronous protocol converter and the receiver synchronous-to-asynchronous protocol converter are each half of a phase-frequency detector.

15. The non-transitory computer-readable medium of claim 10, wherein the asynchronous FIFO buffer includes an asynchronous ripple FIFO buffer.

16. The non-transitory computer-readable medium of claim 10, wherein the asynchronous FIFO buffer includes an asynchronous symmetric pulse (asP*) protocol FIFO buffer.

17. The non-transitory computer-readable medium of claim 10, wherein the slow mode has multiple cycle times that are less than the data-transfer period and that are selectable by the control logic during operation.

18. The non-transitory computer-readable medium of claim 10, wherein the initialization ensures that dropped edges in at least one of the sender clock and the receiver clock are avoided during the normal mode.

19. A computer system comprising an integrated circuit, wherein the integrated circuit includes a source-synchronization interface circuit that includes:

a sender synchronous-to-asynchronous protocol converter that, during operation, receives sender data and a sender clock having a first period and a sender phase, wherein the sender synchronous-to-asynchronous protocol converter has regenerative gain to resolve metastability during phase synchronization of the sender clock and a receiver clock;

an asynchronous first-in, first-out (FIFO) buffer electrically coupled to the sender synchronous-to-asynchronous protocol converter, wherein the asynchronous FIFO buffer includes multiple stages and, during operation, conveys data from the sender synchronous-to-asynchronous protocol converter to a receiver synchronous-to-asynchronous protocol converter;

the receiver synchronous-to-asynchronous protocol converter, electrically coupled to the asynchronous FIFO buffer, which, during operation, receives a receiver clock having a second period, which is one of the first period and a rational multiple of the first period, and a receiver phase, wherein the receiver synchronous-toasynchronous protocol converter has regenerative gain to resolve metastability during the phase synchronization, and wherein the asynchronous FIFO buffer conveys information corresponding to the sender phase to the receiver synchronous-to-asynchronous protocol converter and information corresponding to the receiver phase to the sender synchronous-to-asynchronous protocol converter; and wherein the data is transferred from the sender to the source-synchronization interface circuit, and from the source-synchronization interface circuit to the receiver with a data-transfer period that is the same as one of the first period and the rational multiple of the first period; and control logic, electrically coupled to the asynchronous FIFO buffer, which, during operation, initializes the source-synchronization interface circuit by:

operating at least some of the stages in the asynchronous FIFO buffer in a slow mode having a cycle time less than the data-transfer period for a predetermined number of clock cycles; and subsequently operating at least some of the stages in the asynchronous FIFO buffer in a normal mode having a cycle time that is less than that for the slow mode.

20. The computer system of claim 19, wherein, during the initialization, the control logic operates all of the stages in the asynchronous FIFO buffer in the slow mode for the predetermined number of clock cycles.

\* \* \* \* \*

UNITED STATES PATENT AND TRADEMARK OFFICE
CERTIFICATE OF CORRECTION

PATENT NO. : 9,584,305 B2  
APPLICATION NO. : 14/965389  
DATED : February 28, 2017  
INVENTOR(S) : Yang et al.

Page 1 of 1

It is certified that error appears in the above-identified patent and that said Letters Patent is hereby corrected as shown below:

In the Specification

In Column 6, Line 17, delete "$\Phi_x$," and insert -- $\Phi_X$ --, therefor.

In Column 6, Line 18, delete "$\Phi_x$," and insert -- $\Phi_X$ --, therefor.

In Column 8, Line 53, after "until" insert -- $q_{i-1}$ --.

In the Claims

In Column 16, Line 67, in Claim 2, delete "cyles." and insert -- cycles. --, therefor.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*